(12) United States Patent
White

(10) Patent No.: US 7,579,701 B1
(45) Date of Patent: Aug. 25, 2009

(54) INSULATION AND POWER GENERATION SYSTEM FOR BUILDINGS

(76) Inventor: Ronald J White, 21 Hathaway Cir., Greenville, SC (US) 29617

( * ) Notice: Subject to any disclaimer, the term of this patent is extended or adjusted under 35 U.S.C. 154(b) by 0 days.

(21) Appl. No.: 12/228,466

(22) Filed: Aug. 13, 2008

(51) Int. Cl.
*F03B 13/10* (2006.01)
(52) U.S. Cl. .............................. 290/43; 290/44; 290/54; 290/55; 290/1 R
(58) Field of Classification Search .................. 290/44, 290/55, 1 R, 43, 54
See application file for complete search history.

(56) References Cited

U.S. PATENT DOCUMENTS

| | | | |
|---|---|---|---|
| 4,096,790 A | 6/1978 | Curran | 98/37 |
| 4,242,628 A * | 12/1980 | Mohan et al. | 322/35 |
| 5,596,847 A | 1/1997 | Stephenson | 52/198 |
| 6,043,656 A * | 3/2000 | Ma et al. | 324/309 |
| 6,780,099 B1 | 8/2004 | Harper | 454/186 |

* cited by examiner

*Primary Examiner*—Quyen Leung
*Assistant Examiner*—Iraj A Mohandesi
(74) *Attorney, Agent, or Firm*—Thomas L. Moses; Monahan & Moses, LLC

(57) ABSTRACT

A system for insulating a building and generating electricity includes a method for providing insulation for a building that resists heat transfer through conduction, convection and radiation, creating a series of air channels to transfer heat away from the underside of a roof using air currents, and harnessing such air currents to generate electricity. A series of turbines are positioned within or adjacent to the air channels, and are rotated by the air currents. The turbines are connected to an electrical generator, which generates electricity when the turbines are rotated. The generator is then connected either to an electrical storage device, such as a battery or a series of batteries, or is alternatively connected to the local power grid to provide electrical power back into the power grid.

14 Claims, 3 Drawing Sheets

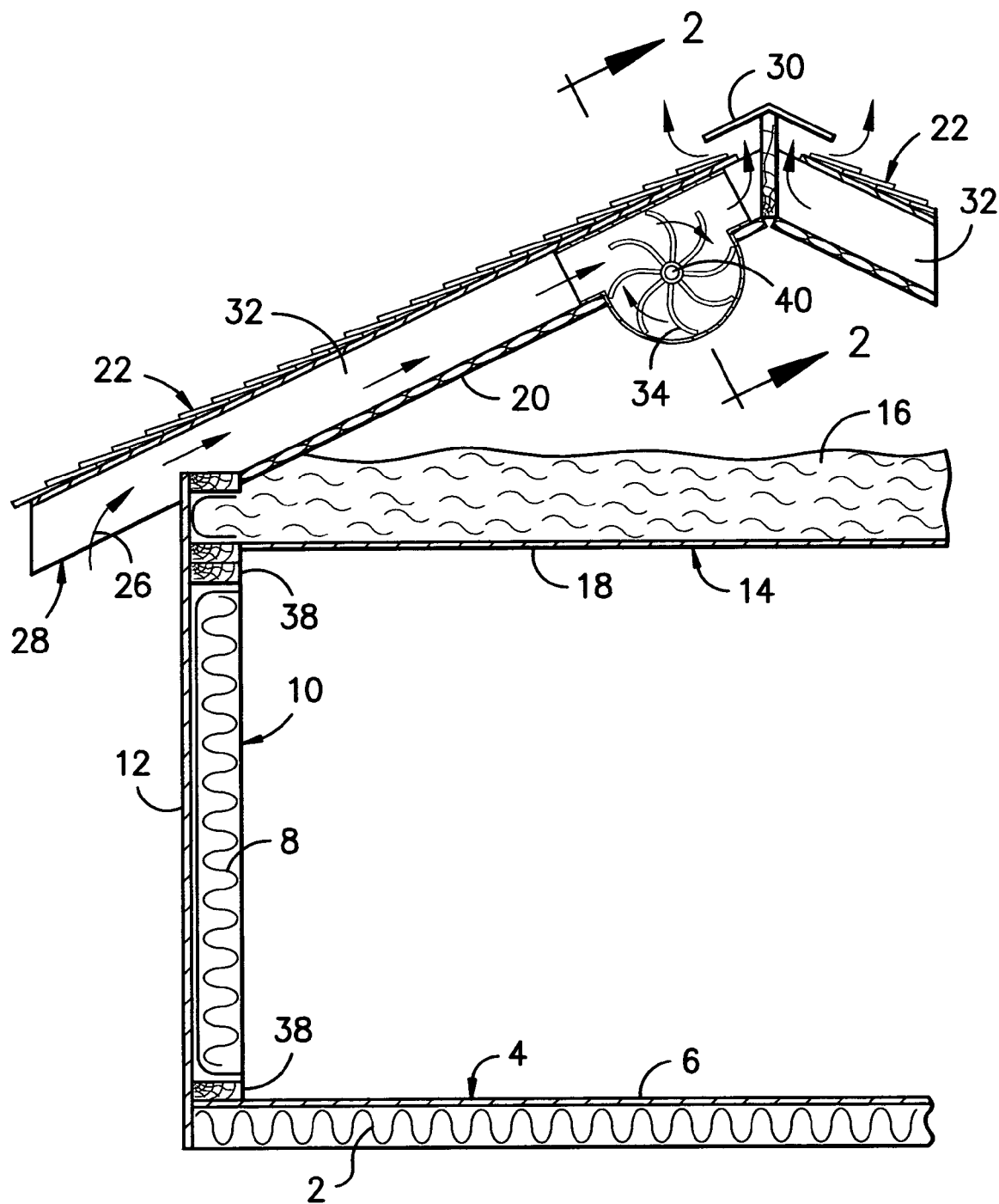
FIG. -1-

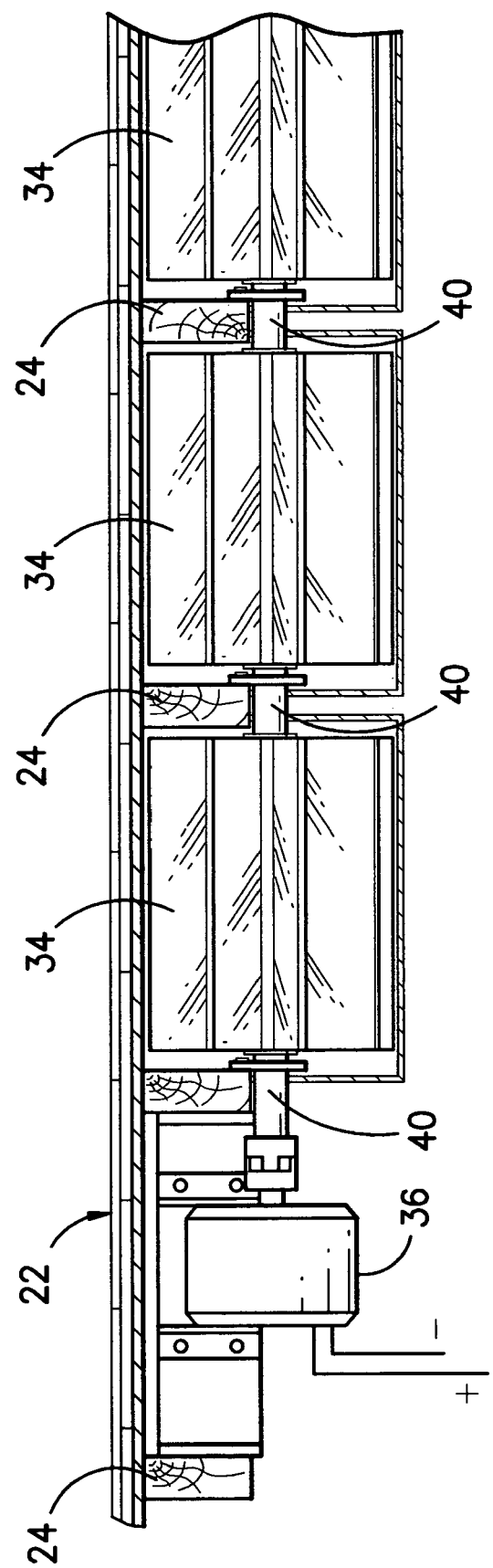
FIG. -2-

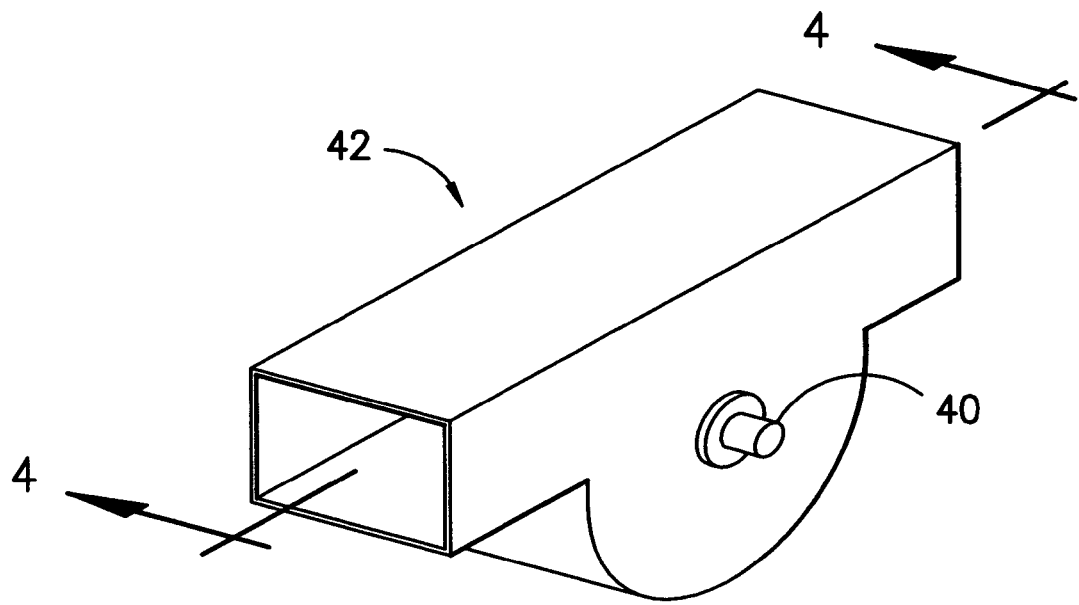
FIG. —3—
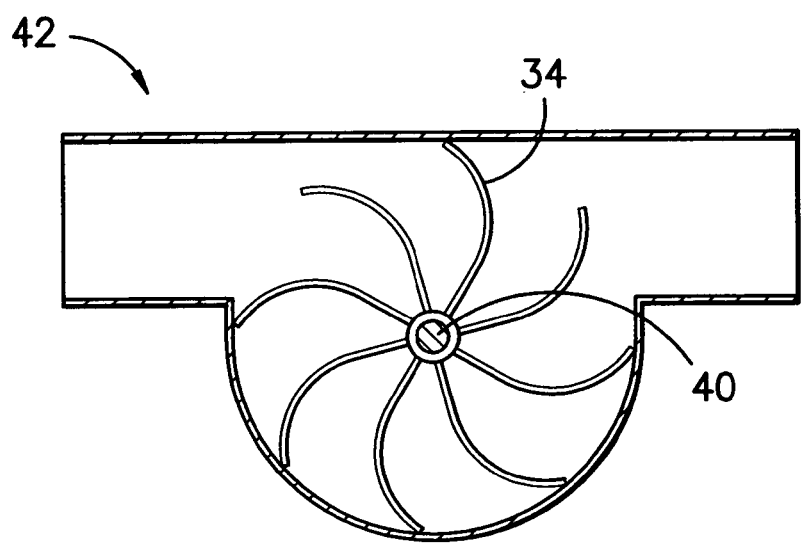
FIG. —4—

INSULATION AND POWER GENERATION SYSTEM FOR BUILDINGS

BACKGROUND OF THE INVENTION

1. Field of the Invention

The present invention relates generally to methods of insulating buildings and creating an air current that may be used to generate electricity. More specifically, the present invention includes a process and system for insulating buildings against heat transfer, including conduction, convection and radiation heat transfer, and thereby creating an air flow between the soffits and a roof vent, which may be used to spin turbines that create electricity.

2. Description of the Prior Art

There are many systems and products currently available for insulating buildings and homes. Proper insulation reduces energy costs. A well insulated structure does not gain or lose heat as quickly as a poorly insulated one, so it is easier to maintain a comfortable temperature within the structure. The retention of conditioned air lowers the demand on the heating and cooling systems, which reduces operating costs and extends the life of the system.

Available in a variety of forms, home insulation can be purchased in blankets, in batts, in a form which is bagged and ready to pour, and in a form which must be blown in place by a contractor using specially designed equipment. Three basic types of products are most commonly used. They include:

1) mineral wool, which includes rock wool and fibrous glass. Both of these products can be blown in place, or purchased in blankets or batts with a foil or paper vapor barrier. Rock wool can also be purchased in bagged form.

2) Plastic foam/resin, which is made of polystyrene, polyurethane, or urea formaldehyde, can be purchased in preformed sheets or bolts, or foamed in place by a contractor. Foam insulation can vary considerably in its final properties depending on the operator's skill, how various reactants are mixed, and the time allowed for curing.

3) Cellulosic insulation, made of any finely ground cellulose product such as recycled newspaper, can be poured or blown in place.

One problem associated with these types of insulation systems is that none of them provide insulation against all three main types of heat transfer: conduction, convection and radiation. For that reason, another type of insulation product has been made available on the insulation market. This product consists of one or two layers of bubble material laminated between layers of aluminum foil to provide thermal resistance. The bubble material is similar to the commonly available bubble-wrap packing material, which is essentially a plastic sheet containing a pattern of enclosed air bubbles.

Conduction is the transfer of thermal energy from a region of higher temperature to a region of lower temperature through direct molecular communication within a medium or between mediums in direct physical contact without a flow of the material medium. The transfer of energy could be primarily by elastic impact as in fluids or by free electron diffusion as predominant in metals or phonon vibration as predominant in insulators. In other words, heat is transferred by conduction when adjacent atoms vibrate against one another, or as electrons move from atom to atom. Conduction is greater in solids, where atoms are in constant contact. In liquids (except liquid metals) and gases, the molecules are usually further apart, giving a lower chance of molecules colliding and passing on thermal energy.

Heat conduction is directly analogous to diffusion of particles into a fluid, in the situation where there are no fluid currents. This type of heat diffusion differs from mass diffusion in behavior, only in as much as it can occur in solids, whereas mass diffusion is limited to fluids. Metals (eg. copper) are usually the best conductors of thermal energy. This is due to the way that metals are chemically bonded: metallic bonds (as opposed to covalent or ionic bonds) have free-moving electrons and form a crystalline structure, greatly aiding in the transfer of thermal energy.

As density decreases so does conduction. Therefore, fluids (and especially gases) are less conductive. This is due to the large distance between atoms in a gas: fewer collisions between atoms means less conduction. Conductivity of gases increases with temperature but only slightly with pressure near and above atmospheric. Conduction does not occur at all in a perfect vacuum. Conduction always takes place from higher to lower temperature.

Convection is a combination of conduction and the transfer of thermal energy by fluid circulation or movement of the hot particles in bulk to cooler areas in a material medium. Unlike the case of pure conduction, now currents in fluids are additionally involved in convection. This movement occurs into a fluid or within a fluid, and cannot happen in solids. In solids, molecules keep their relative position to such an extent that bulk movement or flow is prohibited, and therefore convection does not occur. Convection occurs in two forms: natural and forced convection.

In natural convection, fluid surrounding a heat source receives heat, becomes less dense and rises. The surrounding, cooler fluid then moves to replace it. This cooler fluid is then heated and the process continues, forming a convection current. The driving force for natural convection is buoyancy, a result of differences in fluid density when gravity or any type of acceleration is present in the system. Forced convection, by contrast, occurs when pumps, fans or other means are used to propel the fluid and create an artificially induced convection current. Forced heat convection is sometimes referred to as heat advection, or sometimes simply advection. But advection is a more general process, and in heat advection, the substance being "advected" in the fluid field is simply heat (rather than mass, which is the other natural component in such situations, as mass transfer and heat transfer share generally the same equations). In some heat transfer systems for buildings, both natural and forced convection contribute significantly to the rate of heat transfer.

Radiation is the transfer of heat through electromagnetic radiation. Hot or cold, all objects radiate energy at a rate equal to their emissivity times the rate at which energy would radiate from them if they were a black body. No medium is necessary for radiation to occur; radiation works even in and through a perfect vacuum. The energy from the Sun travels through the vacuum of space before warming the earth.

All three types of heat transfer discussed herein are applicable to home and building insulation, and it is desirable to insulate against each of these types of heat transfer in order to obtain maximum efficiency of the insulation system.

SUMMARY OF THE INVENTION

In view of the foregoing disadvantages inherent in the known types of insulation system, it is an object of the present invention to provide an insulation system that addresses heat transfer through conduction, convection, and radiation. It is a further object of the present invention to provide an insulation system that may be used to create an air current flowing between soffits underneath the eaves of a house or building and a roof vent, where such air currents may be used to power an electrical generator to generate electricity.

In essence, the insulation and power generation system includes a process of insulating a building or home against heat transfer through conduction, convection and radiation, as well as a way to create an air current and use that air current to generate electricity. In a preferred embodiment, the insulation comprises the bubble material laminated between layers of aluminum foil (hereinafter "bubble-foil" insulation). The bubble-foil insulation may be used over the surface of the joist in a building. With respect to attic insulation, the bubble-foil insulation is distributed uniformly across the roof rafters of the attic in such a way that air channels may be formed between the joists extending along an underside of the roof structure. These air channels extend from the soffit vents to a roof vent.

The individual sheets of insulation, in a preferred embodiment, are then air-sealed by taping the seams between the strips of insulation, which is a well-known technique in the insulation industry.

The remainder of the attic may be insulated using more traditional insulation techniques and products, such as fiberglass, plastic foams or resins, or cellulosic insulating materials.

Because the bubble-foil insulation provides a reflective surface in the aluminum foil, heat from the sun that is absorbed by the roof is reflected back toward the roof structure, creating heated air within the air channels. As the air is heated within the air channels, cooler air enters the channels from the soffit vents under the eaves and forces the hot air up through the channels and expels the hot air through the roof vent. A continuous air current is thus generated.

In a preferred embodiment, a series of turbines are installed within the air channels between the joists or rafters. This series of turbines is connected to an electrical generator, so that when the air current turns the turbines, electrical power is generated. The generator may be connected to a storage device, such as a bank of batteries, so that the power stored therein may be used to supply the electrical power needs of the building or home. Alternatively, the generator may be connected to the electrical power grid, and may feed excess electricity back to the local power utility in order to receive a credit on the owner's power bill.

BRIEF DESCRIPTION OF THE DRAWINGS

These and other features, aspects, and advantages of the present invention will become better understood with regard to the following description, appended claims, and accompanying drawings where:

FIG. 1 is a cross-sectional view of a building incorporating one embodiment of the insulation system and electricity generation system set forth herein;

FIG. 2 is a side view of one embodiment of the power generation system, showing a series of turbines attached between rafters underneath a roof, wherein the turbines are connected to each other and to an electrical generator by a rotating shaft;

FIG. 3 is a perspective view of a turbine unit having a casing that may be mounted between rafters in a building; and FIG. 4 is a cross-sectional view of the turbine unit illustrated in FIG. 3, further showing a turbine having curved blades positioned within the unit.

DETAILED DESCRIPTION OF THE INVENTION

A first embodiment of the insulation and power generation system for buildings is shown in FIG. 1. The system incorporates two parts: an insulation system and a power generation system.

The insulation system is particularly directed to homes and buildings having an A-frame structure with an attic. In a preferred embodiment as shown in FIG. 1, a building includes R 30 fiberglass batt insulation 2 in the floors 4 together with T & G glued sheathing 6, and R 15 fiberglass batt insulation 8 in the walls 10, with an exterior sheathing 12 on the outer sides of the walls 10 on the outside of the building. The ceilings 14, in a preferred embodiment, are insulated with R 38 blown fiberglass 16, and may also include a 6 mil poly vapor barrier 18. At the junctures between the floors and the walls, and also between the walls and ceiling, is an air seal 38. The air seal 38 may be formed by applying foam or caulking, as is well-known in the industry. Preferably, air seals 38 are also provided wherever there are holes in the walls or ceilings, such as around electrical outlets, fixtures, etc. Bubble foil insulation 20 is placed on the underside of the roof 22, beneath the rafters 24, in such a way that there are air passages or channels 32 between the rafters 24, extending from the soffit vents 26 under the eaves 28 of the building to a roof vent 30 at the top of the roof. The bubble foil insulation 20 also includes air seals 38, formed by using reflective tape along the seams, to prevent heat transfer from one side to the other. It should be understood that other insulating materials may be used, so long as the insulation selected provides an air sealed environment (in a preferred embodiment) within the building, and so long as the underside of the roof 22 is insulated with a material that prevents or substantially reduces heat transfer through conduction, convection and radiation.

After the building has been insulated as set forth herein, heat generated by the sun shining on the roof creates warm air within the air passages 32. This warm air then rises and is expelled through the roof vent 30, creating an air current that flows from the soffit vents 26, through the air passages 32 and out the roof vent 30. This air current cools the building by transferring heat that would normally be trapped in an attic to the outside and replacing such heated air with cooler air flowing into the soffit vents 26 from the outside and up through the air passages 32. The air current is provided by this system regardless of the temperature outside, because the air current is a result of the temperature differential between the outside air and the temperature of the heated air in the air passages or channels 32. Thus, the air currents are produced whether the temperature is warm or cool outside.

The second part of the present system is the power generation component, as shown in FIG. 2. In a preferred embodiment, the power generation component includes a series of turbines 34 positioned in or adjacent to the air channels 32 so that the air currents generated therein are used to turn the turbines 34. The turbines 34 are connected to an electric generator 36, so that the spinning motion of the turbines 34 is used to generate electricity. The generator 36 may be connected to a storage device, such as a battery or a bank of interconnected batteries, or may be hooked up to the local power grid to provide power back into the grid. Thus, the electricity generated may be used directly for the electrical needs within the building, or it may be fed back into the grid and essentially sold back to the local power utility. The turbines 34 may be placed at any point along the air channels 32, but in a preferred embodiment, the turbines 34 are positioned along an upper portion of the underside of the roof 22 near the roof vent 30. The turbines 34 may be positioned in a linear fashion, so that they rotate about a single axis 40, as shown.

In one embodiment, the turbines may be disposed in a turbine unit 42, as shown in FIGS. 3 and 4. These turbine units may be mounted between the rafters on the underside of a roof, and may be connected in series by the axis 40 to each other, and to an electrical generator 36.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An insulation and power generation system for buildings comprising:
   a building having insulation adjacent floors, walls and ceilings, wherein said insulation provides a substantial air seal; and
   roofing insulation provided adjacent an underside of a roof of said building that provides resistance to heat transfer in the forms of conduction, convection and radiation; and
   at least one air channel between said roofing insulation and said roof extending between a soffit vent positioned under a bottom portion of said roof and a vent provided at an apex of said roof; and
   at least one rotatable turbine in communication with said air channel, wherein said rotatable turbine may be driven by an air current flowing through said air channel; and
   an electrical generator coupled with said rotatable turbine, so that when said turbine rotates, electrical power is thereby generated.

2. The insulation and power generation system for buildings as set forth in claim 1, further comprising an electrical storage member connected to said electrical generator for storing electrical power generated by said electrical generator.

3. The insulation and power generation system for buildings as set forth in claim 1, wherein said roofing insulation includes bubble foil insulation.

4. The insulation and power generation system for buildings as set forth in claim 1, wherein said electrical generator is connected to a local power grid, so that electrical power generated by said generator may be provided to said local power grid.

5. The insulation and power generation system for buildings as set forth in claim 1, wherein said turbine has curved blades.

6. The insulation and power generation system for buildings as set forth in claim 1, wherein said turbine is disposed within a casing that may be mounted on the underside of said roof.

7. A method for insulating a building and generating electricity, said method comprising the steps of:
   insulating a building so that a substantial air seal is formed;
   providing roofing insulation underneath a roof of said building that is resistant to heat transfer through conduction, convection and radiation;
   providing at least one air channel between said roof and said roofing insulation;
   providing a rotatable turbine that may be rotated by an air current flowing through said air channel; and
   connecting said rotatable turbine to an electrical generator so that when said turbine rotates, said generator generates electricity.

8. The method set forth in claim 7, further comprising the step of connecting said electrical generator to an electrical storage device.

9. The method set forth in claim 8, wherein said electrical storage device is a battery.

10. The method set forth in claim 8, wherein said electrical storage device comprises a series of interconnected batteries.

11. The method set forth in claim 7, further comprising the step of connecting said electrical generator to a local power grid, so that electrical power generated by said generator is provided to said local power grid.

12. The method set forth in claim 7, wherein said roofing insulation comprises bubble foil insulation.

13. The method set forth in claim 7, wherein said turbine has curved blades.

14. The method set forth in claim 7, wherein said turbine is disposed within a casing that may be mounted to an underside of said roof.

* * * * *